United States Patent
Wu et al.

(10) Patent No.: US 9,733,526 B2
(45) Date of Patent: Aug. 15, 2017

(54) CURVED DISPLAY PANEL AND CURVED DISPLAY APPARATUS

(71) Applicant: Shenzhen China Star Optoelectronics Technology Co., Ltd., Guangdong (CN)

(72) Inventors: Chuan Wu, Guangdong (CN); Zui Wang, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 100 days.

(21) Appl. No.: 14/408,004

(22) PCT Filed: Nov. 19, 2014

(86) PCT No.: PCT/CN2014/091540
§ 371 (c)(1),
(2) Date: Dec. 15, 2014

(87) PCT Pub. No.: WO2016/065675
PCT Pub. Date: May 6, 2016

(65) Prior Publication Data
US 2016/0124273 A1    May 5, 2016

(30) Foreign Application Priority Data
Oct. 30, 2014  (CN) .......................... 2014 1 0597351

(51) Int. Cl.
*G02F 1/1335*    (2006.01)
*G02F 1/1343*    (2006.01)
*G02F 1/1362*    (2006.01)

(52) U.S. Cl.
CPC .. *G02F 1/134309* (2013.01); *G02F 1/133514* (2013.01); *G02F 2001/136218* (2013.01)

(58) Field of Classification Search
CPC ................. G02F 1/1343; G02F 1/1335; G02F 1/133514; G02F 1/1368; G02F 2001/136218
See application file for complete search history.

(56) References Cited

U.S. PATENT DOCUMENTS

| 2009/0096965 A1 | 4/2009 | Nagata |
| 2014/0176856 A1* | 6/2014 | Lee ................... G02F 1/133305 349/61 |
| 2015/0029449 A1* | 1/2015 | Woo ................... G02F 1/133512 349/110 |

(Continued)

FOREIGN PATENT DOCUMENTS

| CN | 102436103 | 5/2012 |
| CN | 104049399 | 9/2014 |
| JP | 2006-106603 | 4/2006 |

*Primary Examiner* — Timothy L Rude

(57) ABSTRACT

The present invention provides a curved display panel and a curved display apparatus. The curved display panel comprises a curved color filter substrate, a liquid crystal layer and a curved thin film transistor array substrate. The curved color filter substrate comprises a first curved substrate, a color-resisting array layer, a first protective layer and a common electrode; the curved thin film transistor array substrate comprises a second curved substrate and a pixel array layer. The present invention can diminish the dark fringes appearing in border areas of different domains.

14 Claims, 4 Drawing Sheets

(56) References Cited

U.S. PATENT DOCUMENTS

| | | | |
|---|---|---|---|
| 2015/0185565 A1* | 7/2015 | Park | G02F 1/134363 349/43 |
| 2015/0219940 A1* | 8/2015 | Kim | G02F 1/1336 362/612 |
| 2015/0316803 A1* | 11/2015 | Zhang | H01L 27/1259 257/72 |

* cited by examiner

CURVED DISPLAY PANEL AND CURVED DISPLAY APPARATUS

RELATED APPLICATIONS

This application is a National Phase of PCT Patent Application No. PCT/CN2014/091540 having International filing date of Nov. 19, 2014, which claims the benefit of priority of Chinese Patent Application No. 201410597351.5 filed on Oct. 30, 2014. The contents of the above applications are all incorporated by reference as if fully set forth herein in their entirety.

BACKGROUND OF THE INVENTION

1. Field of the Invention

The present invention generally relates to a display technical field, and more particularly to a curved display panel and curved display apparatus.

2. Description of Prior Art

In a traditional VA (Vertical Alignment) type display, sub-pixels are generally divided into several domains for solving the color shift issue of the view angle.

The pixel units in the sub-pixel generally show as a fish bond structure. The border areas among the domains are named as ITO (Indium Tin Oxide) Trunks.

With the increase of the domains, the ITO trunks increases.

In the manufacture process of the curved display, the top and bottom substrates take the center of the panel as the base. In the horizontal direction, the relative shifts gradually occur toward the left and the right. The electric fields in the pixel units change to lead to that the locations of the curved display around the ITO trunks get dark.

Therefore, there is a need to provide a new technical solution for solving the aforesaid technical issue.

SUMMARY OF THE INVENTION

An objective of the present invention is to provide a curved display panel and a curved display apparatus capable of diminishing the dark fringes appearing in border areas of different domains.

For solving the aforesaid issue, the technical solution of the present invention is:

a curved display panel, and the curved display panel comprises: a curved color filter substrate, comprising: a first curved substrate; a color-resisting array layer, positioned on the first curved substrate; a first protective layer, positioned on the color-resisting array layer; and a common electrode, positioned on the first protective layer; a liquid crystal layer; and a curved thin film transistor array substrate, comprising: a second curved substrate; and a pixel array layer, positioned on the second curved substrate; wherein the curved color filter substrate and the curved thin film transistor array substrate are oppositely assembled as one, and the liquid crystal layer is positioned between the curved color filter substrate and the curved thin film transistor array substrate; the pixel array layer further comprising: at least one shielding electrode, and the shielding electrode is positioned at at least one side of a pixel electrode, and the shielding electrode is above or under the pixel electrode in a first direction, and the first direction is a direction from a curved surface where the pixel area is positioned toward a centre of the curved surface along a radius of a pixel area.

In the foregoing curved display panel, the first curved substrate comprises at least one color-resisting area; the second curved substrate comprises at least one pixel area; a location of the color-resisting area on the first curved substrate corresponds to a location of the pixel area on the second curved substrate, and the curved color filter substrate has a first curvature radius at the color-resisting area, and the curved thin film transistor array substrate has a second curvature radius at the pixel area, and the second curvature radius is larger than the first curvature radius.

In the foregoing curved display panel, the pixel array layer comprises: at least one pixel unit, and the pixel unit is positioned on the pixel area, and the pixel unit comprises the pixel electrode; the color-resisting array layer comprises: at least one color-resisting unit, and the color-resisting unit is positioned on the color-resisting area; wherein the color-resisting area and the pixel area have a common centre.

In the foregoing curved display panel, the pixel electrode comprises: a main electrode; and at least two branch electrodes; wherein the main electrode is connected to the branch electrodes, and a straight line where the main electrode is and a straight line where the branch electrode is have an included angle; the pixel area comprises: a first area; and a second area; wherein the first area is at an edge of the pixel area, and the main electrode is on the first area, and the branch electrodes are on the second area; wherein the color-resisting area corresponds to the second area.

A curved display panel, and the curved display panel comprises: a curved color filter substrate, comprising: a first curved substrate; a color-resisting array layer, positioned on the first curved substrate; a first protective layer, positioned on the color-resisting array layer; and a common electrode, positioned on the first protective layer; a liquid crystal layer; and a curved thin film transistor array substrate, comprising: a second curved substrate; and a pixel array layer, positioned on the second curved substrate; wherein the curved color filter substrate and the curved thin film transistor array substrate are oppositely assembled as one, and the liquid crystal layer is positioned between the curved color filter substrate and the curved thin film transistor array substrate In the foregoing curved display panel, the first curved substrate comprises at least one color-resisting area; the second curved substrate comprises at least one pixel area; a location of the color-resisting area on the first curved substrate corresponds to a location of the pixel area on the second curved substrate, and the curved color filter substrate has a first curvature radius at the color-resisting area, and the curved thin film transistor array substrate has a second curvature radius at the pixel area, and the second curvature radius is larger than the first curvature radius.

In the foregoing curved display panel, the pixel array layer comprises: at least one pixel unit, and the pixel unit is positioned on the pixel area, and the pixel unit comprises the pixel electrode; the color-resisting array layer comprises: at least one color-resisting unit, and the color-resisting unit is positioned on the color-resisting area; wherein the color-resisting area and the pixel area have a common centre.

In the foregoing curved display panel, the pixel electrode comprises: a main electrode; and at least two branch electrodes; wherein the main electrode is connected to the branch electrodes, and a straight line where the main electrode is and a straight line where the branch electrode is have an included angle; the pixel area comprises: a first area; and a second area; wherein the first area is at an edge of the pixel area, and the main electrode is on the first area, and the branch electrodes are on the second area; wherein the color-resisting area corresponds to the second area.

In the foregoing curved display panel, at least a portion of a light leakproof bar on the curved color filter substrate has a second projection on the second curved substrate, and the second projection coincides with the first area, wherein the light leakproof bar is a portion of a black matrix on the curved color filter substrate.

In the foregoing curved display panel, both the color-resisting area and the pixel area are curved surfaces having the same centre, and the second curvature radius is equal to a sum of the first curvature radius and a predetermined value, wherein the predetermined value is a distance between the color-resisting area and the pixel area.

In the foregoing curved display panel, the pixel array layer further comprises: at least one shielding electrode, and the shielding electrode is positioned at at least one side of a pixel electrode.

In the foregoing curved display panel, the shielding electrode is employed for preventing an electric interference generated by one of two adjacent pixel units to the other.

A curved display apparatus, wherein the curved display apparatus comprises: a curved backlight module; and a curved display panel, and the curved display panel and the curved backlight module are stacked and assembled as one, and the curved display panel comprises: a curved color filter substrate, comprising: a first curved substrate; a color-resisting array layer, positioned on the first curved substrate; a first protective layer, positioned on the color-resisting array layer; and a common electrode, positioned on the first protective layer; a liquid crystal layer; and a curved thin film transistor array substrate, comprising: a second curved substrate; and a pixel array layer, positioned on the second curved substrate; wherein the curved color filter substrate and the curved thin film transistor array substrate are oppositely assembled as one, and the liquid crystal layer is positioned between the curved color filter substrate and the curved thin film transistor array substrate.

In the foregoing curved display apparatus, the first curved substrate comprises at least one color-resisting area; the second curved substrate comprises at least one pixel area; a location of the color-resisting area on the first curved substrate corresponds to a location of the pixel area on the second curved substrate, and the curved color filter substrate has a first curvature radius at the color-resisting area, and the curved thin film transistor array substrate has a second curvature radius at the pixel area, and the second curvature radius is larger than the first curvature radius.

In the foregoing curved display apparatus, the pixel array layer comprises: at least one pixel unit, and the pixel unit is positioned on the pixel area, and the pixel unit comprises the pixel electrode; the color-resisting array layer comprises: at least one color-resisting unit, and the color-resisting unit is positioned on the color-resisting area; wherein the color-resisting area and the pixel area have a common centre.

In the foregoing curved display apparatus, the pixel electrode comprises: a main electrode; and at least two branch electrodes; wherein the main electrode is connected to the branch electrodes, and a straight line where the main electrode is and a straight line where the branch electrode is have an included angle; the pixel area comprises: a first area; and a second area; wherein the first area is at an edge of the pixel area, and the main electrode is on the first area, and the branch electrodes are on the second area; wherein the color-resisting area corresponds to the second area.

In the foregoing curved display apparatus, at least a portion of a light leakproof bar on the curved color filter substrate has a second projection on the second curved substrate, and the second projection coincides with the first area, wherein the light leakproof bar is a portion of a black matrix on the curved color filter substrate.

In the foregoing curved display apparatus, both the color-resisting area and the pixel area are curved surfaces having the same centre, and the second curvature radius is equal to a sum of the first curvature radius and a predetermined value, wherein the predetermined value is a distance between the color-resisting area and the pixel area.

In the foregoing curved display apparatus, the pixel array layer further comprises: at least one shielding electrode, and the shielding electrode is positioned at at least one side of a pixel electrode.

In the foregoing curved display apparatus, the shielding electrode is employed for preventing an electric interference generated by one of two adjacent pixel units to the other.

Compared with prior arts, present invention is capable of diminishing the dark fringes appearing in border areas of different domains and accordingly promoting the display quality.

For a better understanding of the aforementioned content of the present invention, preferable embodiments are illustrated in accordance with the attached figures for further explanation:

DETAILED DESCRIPTION OF THE INVENTION

The words used in this specification, "an embodiment" mean serving as an example, instance, or illustration. Further, in this specification and the appended claims used in the articles "a" may generally be construed to mean "one or more" unless specified otherwise or clear from the context, the singular form of the guide.

Figure 1:
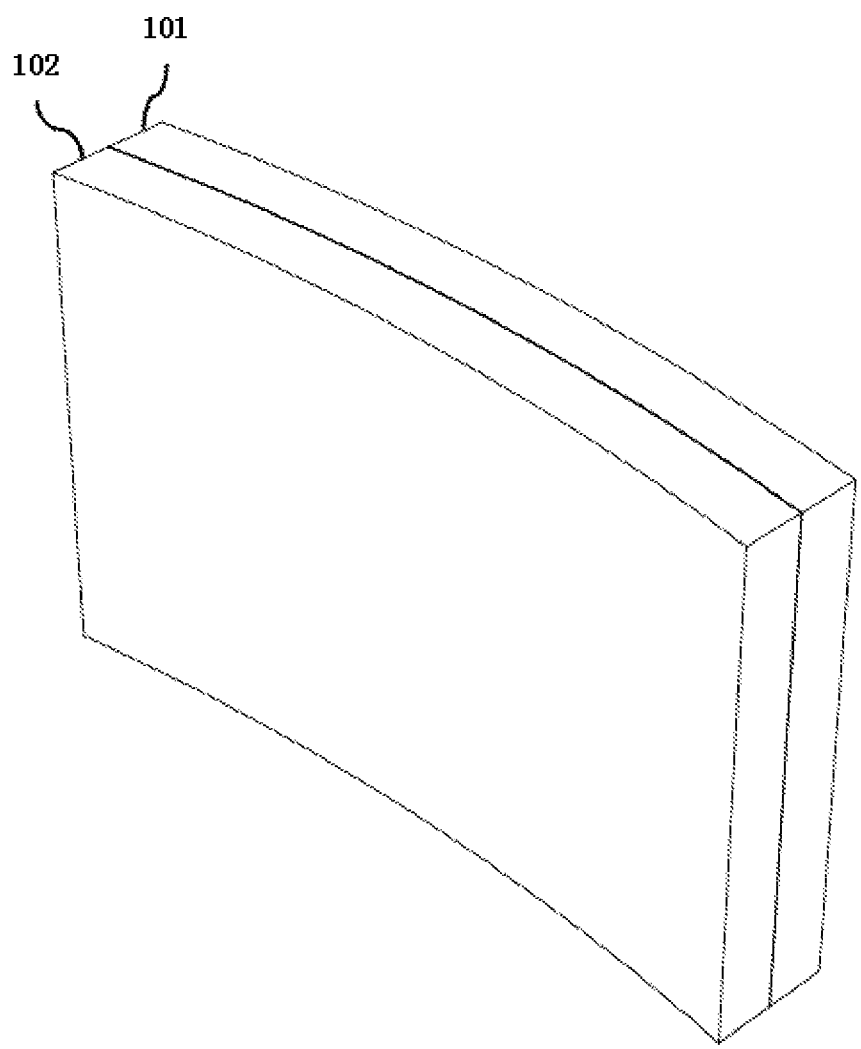
FIG. 1 is a diagram of a curved display apparatus according to the present invention.
Figure 2:
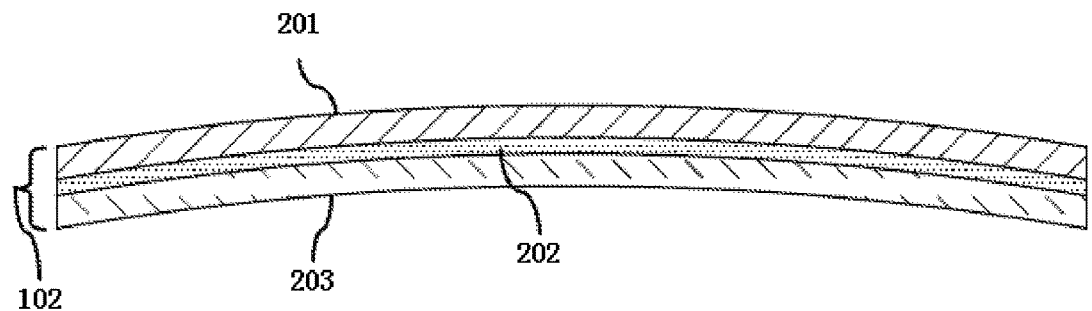
FIG. 2 is a sectional diagram of the curved display panel shown in FIG. 1.

Please refer to FIG. 1 and FIG. 2. FIG. 1 is a diagram of a curved display apparatus according to the present invention. FIG. 2 is a sectional diagram of the curved display panel shown in FIG. 1.

The curved display apparatus of this embodiment comprises a curved backlight module 101 and a curved display panel 102. The present invention provides a curved display panel. The curved display panel 102 and the curved backlight module 101 are stacked and assembled as one.

The curved display panel 102 comprises a curved color filter substrate 203, a liquid crystal layer 202 and a curved thin film transistor array substrate 201.

The curved color filter substrate 203 comprises first curved substrate 405, a color-resisting array layer, a first protective layer 408 and a common electrode 409. The color-resisting array layer is positioned on the first curved substrate 405. The first protective layer 408 is positioned on the color-resisting array layer. The common electrode 409 is positioned on the first protective layer 408.

The curved thin film transistor array substrate 201 comprises a second curved substrate 401, a pixel array layer and a second protective layer 404. The pixel array layer is positioned on the second curved substrate 401. The second protective layer 404 is positioned on the pixel electrode layer. The pixel array layer comprises a scan line array, a data line array, a thin film transistor switch array, a pixel electrode array. The scan line array comprises at least one scan line 301. The data line array comprises at least one data line 302. The thin film transistor array comprises at least one thin film transistor switch 303. The pixel electrode array comprises at least one pixel electrode 304.

The curved color filter substrate 203 and the curved thin film transistor array substrate 201 are oppositely assembled as one. The liquid crystal layer 202 is positioned between the curved color filter substrate 203 and the curved thin film transistor array substrate 201.

The first curved substrate 405 comprises at least one color-resisting area. The at least one color-resisting area is arranged in a form of array. The second curved substrate 401 comprises at least one pixel area. The at least one pixel area is arranged in a form of array. A location of the color-resisting area on the first curved substrate 405 corresponds to a location of the pixel area on the second curved substrate 401. The curved color filter substrate 203 has a first curvature radius at the color-resisting area, and the curved thin film transistor array substrate 201 has a second curvature radius at the pixel area. The second curvature radius is larger than the first curvature radius. Specifically, the second curvature radius is equal to a sum of the first curvature radius and a predetermined value, wherein the predetermined value is a distance between the color-resisting area and the pixel area.

In the first curved substrate 405, the curvature radiuses of different color-resisting areas can be different or the same. Similarly, in the second curved substrate 401, the curvature radiuses of different pixel areas can be different or the same.

Figure 3:
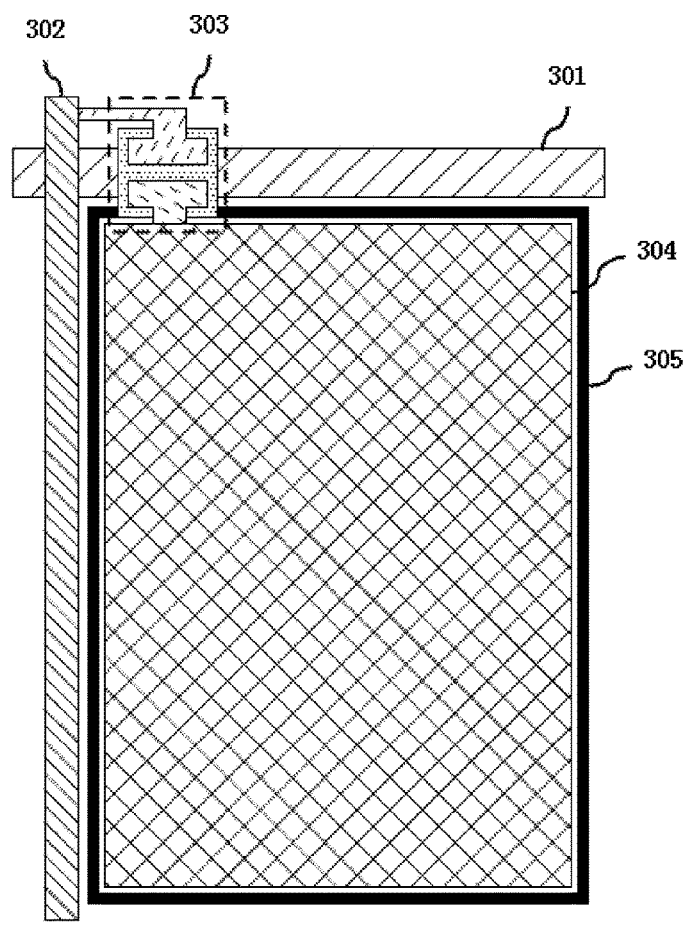
FIG. 3 is a position relationship diagram of a pixel electrode and a shielding electrode in the curved display panel.

In this embodiment, the pixel array layer further comprises at least one shielding electrode 305. The shielding electrode 305 is positioned at at least one side of a pixel electrode. As shown in FIG. 3, the shielding electrode 305 can encircle the pixel electrode.

Specifically, the shielding electrode 305 is positioned in a border area between two adjacent pixel units. The shielding electrode 305 is employed for protecting the liquid crystal molecules in the corresponding pixel unit from the electric interference of the adjacent pixel unit. In the other word, the shielding electrode 305 is employed for preventing an electric interference generated by one of two adjacent pixel units to the other.

The shielding electrode 305 and the pixel electrode can be respectively positioned at different layers in a first direction. The first direction is a direction from a curved surface where the pixel area is positioned toward a centre of the curved surface along a radius of a pixel area. For instance, the shielding electrode 305 is above or under the pixel electrode in the first direction.

In this embodiment, the pixel array layer comprises at least one pixel unit. The pixel unit is positioned on the pixel area, and the pixel unit comprises the pixel electrode. The pixel electrode is an electrode set up of being a curved surface.

Figure 4:
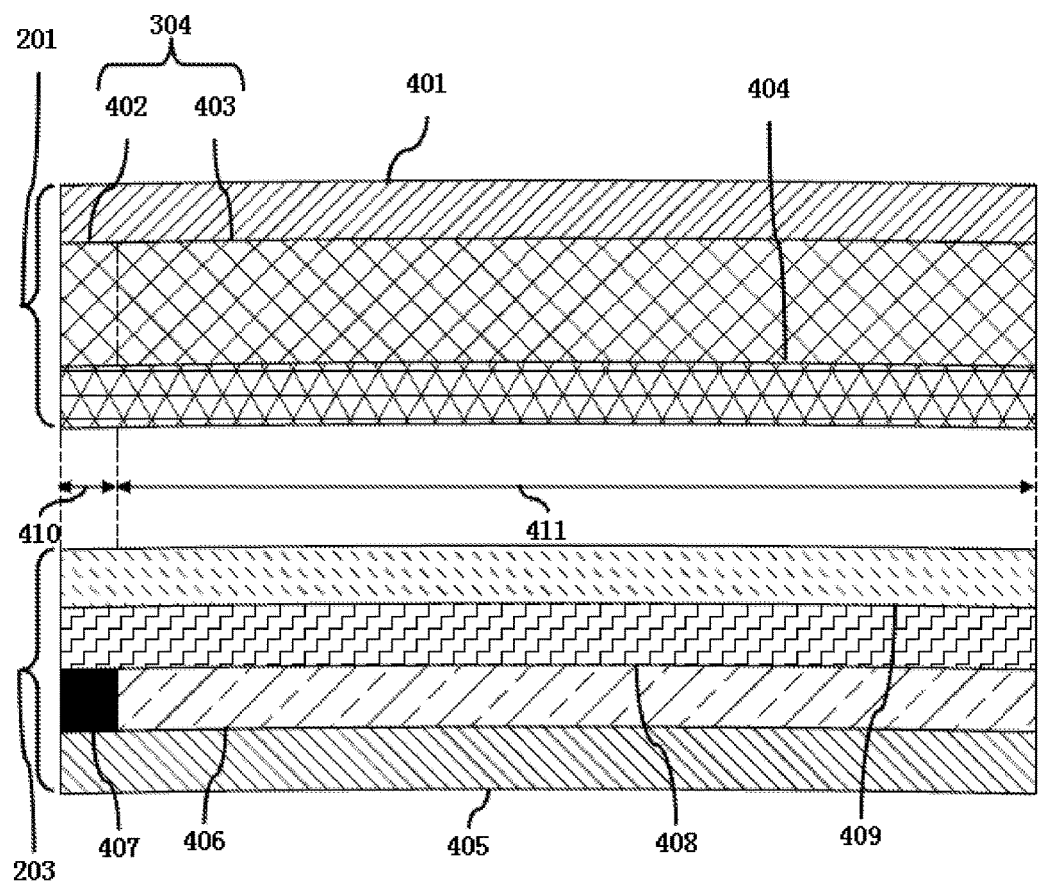
FIG. 4 is a position relationship diagram of a pixel unit and a color-resisting unit shown in FIG. 2.
Figure 5:
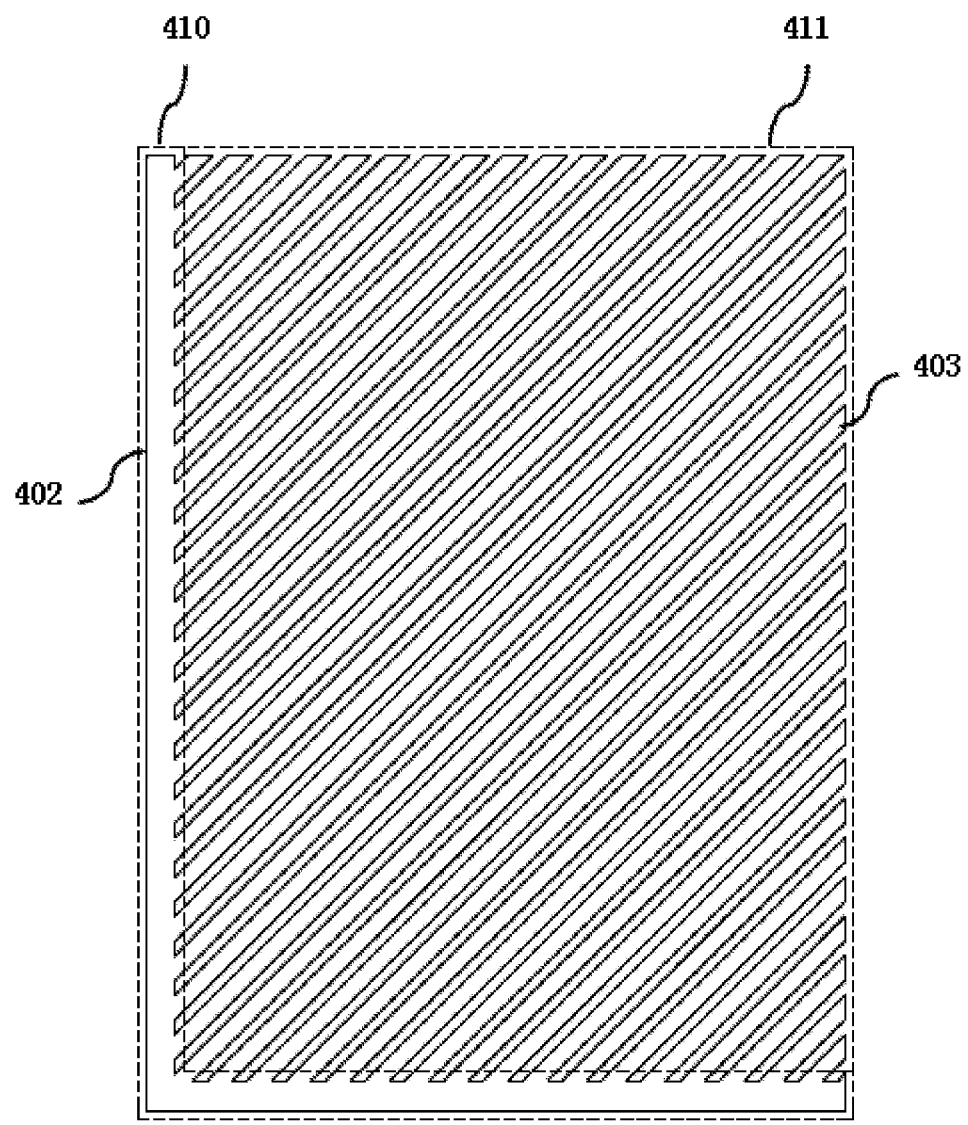
FIG. 5 is diagram of a pixel electrode shown in FIG. 4.

The color-resisting array layer comprises at least one color-resisting unit 406. The color-resisting unit 406 is positioned on the color-resisting area. The color-resisting unit 406 comprises a color-resisting block. The color-resisting block is a color-resisting material set up of being a curved surface as shown in FIG. 4.

The color-resisting area and the pixel area have a common centre. That is, the color-resisting area and the pixel area are curved surfaces having the same centre but different radiuses.

In this embodiment, the pixel electrode comprises a main electrode 402 and at least two branch electrodes 403.

The main electrode 402 is connected to the branch electrodes 403. A straight line where the main electrode 402 is and a straight line where the branch electrode 403 is have an included angle.

The pixel area comprises at least one first area 410 and a second area 411. The first area 410 is at an edge of the pixel area. The main electrode 402 is on the first area 410, and the branch electrodes 403 are on the second area 411. That is to say, the main electrode 402 is positioned at an edge of the pixel area to reduce the border area of different domains in the pixel electrode. Accordingly, the dark fringes appearing in the aforesaid border areas due to the liquid crystal tilt disorientation can be diminished to promote the display quality.

The color-resisting area corresponds to the second area 410. That is, the color-resisting area has a first projection on the second curved substrate 401. The first projection corresponds to the second area 411 of the pixel area. The first area 410 does not coincide with the first projection.

In the aforesaid technical solution, the pixel electrode merely comprises one domain. Therefore, the appearance of the dark fringes can be effectively diminished. Besides, the aforesaid technical solution can allow the formation default of the main electrode 402 to be hidden in the edge of the image formed by the color-resisting unit 406. In the other word, the shadow of the main electrode 402 does not appear in the image formed by the color-resisting unit 406. Therefore, the transmittance of the pixel unit can be raised. Meanwhile, the display image quality of the pixel unit can be promoted.

Moreover, at least a portion of a light leakproof bar 407 on the curved color filter substrate 203 has a second projection on the second curved substrate 401, and the second projection coincides with the first area 410. That is to say, the light leakproof bar 407 is a portion of a black matrix (BM) on the curved color filter substrate 203.

Despite relative to one or more implementations shown and described the present disclosure, those skilled in the art based on the present specification and drawings will occur upon reading and understanding the equivalent variations and modifications. The present disclosure includes all such modifications and variations, and only by the scope of the appended claims limit. Particularly with regard to various functions performed by the above-described components performed, the terms used to describe such components are intended to perform the function corresponding to the specified component (e.g., which is functionally equivalent) of any component (unless otherwise indicated), even if the structure of the implementation and execution of the function of the present disclosure shown herein disclosed exemplary not structurally equivalent. Additionally, although a particular feature of the present disclosure has been made with respect to certain implementations, only one is open, but this feature may be as given or particular application and the purpose of enabling a desired one or more other implementations Other combinations of features. Moreover, the terms "comprising," "having," "containing," or variants thereof are used in the detailed description or the claims, such a term is intended to the term "comprising" includes similar manner.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A curved display panel, wherein the curved display panel comprises:
   a curved color filter substrate, comprising:
      a first curved substrate;
      a color-resisting array layer, positioned on the first curved substrate;
      a first protective layer, positioned on the color-resisting array layer; and
      a common electrode, positioned on the first protective layer;
   a liquid crystal layer; and
   a curved thin film transistor array substrate, comprising:
      a second curved substrate; and
      a pixel array layer, positioned on the second curved substrate;
   wherein the curved color filter substrate and the curved thin film transistor array substrate are oppositely assembled as one, and the liquid crystal layer is positioned between the curved color filter substrate and the curved thin film transistor array substrate;
   the pixel array layer further comprising:
      at least one shielding electrode, and the shielding electrode is positioned at at least one side of a pixel electrode, and the shielding electrode is above or under the pixel electrode in a first direction, and the first direction is a direction from a curved surface where the pixel area is positioned toward a centre of the curved surface along a radius of a pixel area; wherein
      the first curved substrate comprises at least one color-resisting area;
      the second curved substrate comprises at least one pixel area;
      a location of the color-resisting area on the first curved substrate corresponds to a location of the pixel area on the second curved substrate, and the curved color filter substrate has a first curvature radius at the color-resisting area, and the curved thin film transistor array substrate has a second curvature radius at the pixel area, and the second curvature radius is larger than the first curvature radius;
      the pixel electrode comprises a main electrode and at least two branch electrodes; wherein the main electrode is connected to the branch electrodes, and a straight line where the main electrode is located and a straight line where the branch electrode is located have an included angle therebetween; the main electrode is L-shaped; the branch electrodes extend from an inner side of the main electrode; the branch electrodes are all parallel to each other; wherein the pixel area only comprises a first area and a second area; wherein the first area is at an edge of the pixel area and is L-shaped, and the main electrode is disposed in the first area, the branch electrodes are disposed in the second area; the color-resisting area corresponds to the second area.

2. The curved display panel according to claim claim 1, wherein
   the pixel array layer comprises:
      at least one pixel unit, and the pixel unit is positioned on the pixel area, and the pixel unit comprises the pixel electrode;
   the color-resisting array layer comprises:
      at least one color-resisting unit, and the color-resisting unit is positioned on the color-resisting area;
   wherein the color-resisting area and the pixel area have a common centre.

3. A curved display panel, wherein the curved display panel comprises:
   a curved color filter substrate, comprising:
      a first curved substrate;
      a color-resisting array layer, positioned on the first curved substrate;
      a first protective layer, positioned on the color-resisting array layer; and
      a common electrode, positioned on the first protective layer;
   a liquid crystal layer; and
   a curved thin film transistor array substrate, comprising:
      a second curved substrate; and
      a pixel array layer, positioned on the second curved substrate;
   wherein the curved color filter substrate and the curved thin film transistor array substrate are oppositely assembled as one, and the liquid crystal layer is positioned between the curved color filter substrate and the curved thin film transistor array substrate; wherein
   the first curved substrate comprises at least one color-resisting area;
   the second curved substrate comprises at least one pixel area;
   a location of the color-resisting area on the first curved substrate corresponds to a location of the pixel area on the second curved substrate, and the curved color filter substrate has a first curvature radius at the color-resisting area, and the curved thin film transistor array substrate has a second curvature radius at the pixel area, and the second curvature radius is larger than the first curvature radius;
   the pixel array layer comprises at least one pixel unit; the pixel unit is positioned on the pixel area; the pixel unit comprises a pixel electrode; the pixel electrode comprises a main electrode and at least two branch electrodes; wherein the main electrode is connected to the branch electrodes, and a straight line where the main electrode is located and a straight line where the branch electrode is located have an included angle therebetween; the main electrode is L-shaped; the branch electrodes extend from an inner side of the main electrode; the branch electrodes are all parallel to each other; wherein the pixel area only comprises a first area and a second area wherein the first area is at an edge of the pixel area and is L-shaped, and the main electrode is disposed in the first area, the branch electrodes are disposed in the second area; the color-resisting area corresponds to the second area.

4. The curved display panel according to claim 3, wherein the color-resisting array layer comprises:
   at least one color-resisting unit, and the color-resisting unit is positioned on the color-resisting area;
   wherein the color-resisting area and the pixel area have a common centre.

5. The curved display panel according to claim 4, wherein at least a portion of a light leakproof bar on the curved color filter substrate has a second projection on the second curved substrate; and the second projection coincides with the first area, wherein the light leakproof bar is a portion of a black matrix on the curved color filter substrate.

6. The curved display panel according to claim 3, wherein both the color-resisting area and the pixel area are curved surfaces having the same centre, and the second curvature radius is equal to a sum of the first curvature radius and a predetermined value, wherein the predetermined value is a distance between the color-resisting area and the pixel area.

7. The curved display panel according to claim 3, wherein the pixel array layer further comprises:
    at least one shielding electrode, and the shielding electrode is positioned at at least one side of a pixel electrode.

8. The curved display panel according to claim 7, wherein the shielding electrode is employed for preventing an electric interference generated by one of two adjacent pixel units to the other.

9. A curved display apparatus, wherein the curved display apparatus comprises:
    a curved backlight module; and
    a curved display panel, and the curved display panel and the curved backlight module are stacked and assembled as one, and the curved display panel comprises:
    a curved color filter substrate, comprising:
        a first curved substrate;
        a color-resisting array layer, positioned on the first curved substrate;
        a first protective layer, positioned on the color-resisting array layer; and
        a common electrode, positioned on the first protective layer;
    a liquid crystal layer; and
    a curved thin film transistor array substrate, comprising:
        a second curved substrate; and
        a pixel array layer, positioned on the second curved substrate;
    wherein the curved color filter substrate and the curved thin film transistor array substrate are oppositely assembled as one, and the liquid crystal layer is positioned between the curved color filter substrate and the curved thin film transistor array substrate; wherein
    the first curved substrate comprises at least one color-resisting area;
    the second curved substrate comprises at least one pixel area;
    a location of the color-resisting area on the first curved substrate corresponds to a location of the pixel area on the second curved substrate, and the curved color filter substrate has a first curvature radius at the color-resisting area, and the curved thin film transistor array substrate has a second curvature radius at the pixel area, and the second curvature radius is larger than the first curvature radius;
    the pixel array layer comprises at least one pixel unit; the pixel unit is positioned on the pixel area; the pixel unit comprises a pixel electrode; the pixel electrode comprises a main electrode and at least two branch electrodes; wherein the main electrode is connected to the branch electrodes, and a straight line where the main electrode is located and a straight line where the branch electrode is located have an included angle therebetween; the main electrode is L-shaped; the branch electrodes extend from an inner side of the main electrode; the branch electrodes are all parallel to each other; wherein the pixel area only comprises a first area and a second area; wherein the first area is at an edge of the pixel area and is L-shaped, and the main electrode is disposed in the first area, the branch electrodes are disposed in the second area; the color-resisting area corresponds to the second area.

10. The curved display apparatus according to claim 9, wherein
    the color-resisting array layer comprises:
    at least one color-resisting unit, and the color-resisting unit is positioned on the color-resisting area;
    wherein the color-resisting area and the pixel area have a common centre.

11. The curved display apparatus according to claim 10, wherein at least a portion of a light leakproof bar on the curved color filter substrate has a second projection on the second curved substrate, and the second projection coincides with the first area, wherein the light leakproof bar is a portion of a black matrix on the curved color filter substrate.

12. The curved display apparatus according to claim 9, wherein both the color-resisting area and the pixel area are curved surfaces having the same centre, and the second curvature radius is equal to a sum of the first curvature radius and a predetermined value, wherein the predetermined value is a distance between the color-resisting area and the pixel area.

13. The curved display apparatus according to claim 9, wherein the pixel array layer further comprises:
    at least one shielding electrode, and the shielding electrode is positioned at at least one side of a pixel electrode.

14. The curved display apparatus according to claim 13, wherein the shielding electrode is employed for preventing an electric interference generated by one of two adjacent pixel units to the other.

* * * * *